US009277255B1

(12) United States Patent
Rowe (10) Patent No.: US 9,277,255 B1
(45) Date of Patent: Mar. 1, 2016

(54) METERING OF INTERNET PROTOCOL VIDEO STREAMS (71) Applicant: Google Inc., Mountain View, CA (US)

(72) Inventor: Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/844,519

(22) Filed: Mar. 15, 2013

(51) Int. Cl.
*G06F 15/16* (2006.01)
*H04N 21/24* (2011.01)

(52) U.S. Cl.
CPC .................. *H04N 21/2407* (2013.01)

(58) Field of Classification Search
CPC ............ G06F 17/30817; G06F 17/30784
USPC ................. 725/910, 14, 46; 709/231
See application file for complete search history.

(56) References Cited

U.S. PATENT DOCUMENTS

| 5,796,952 | A | * | 8/1998 | Davis | G06F 11/3438 707/E17.12 |
|---|---|---|---|---|---|
| 6,108,637 | A | * | 8/2000 | Blumenau | G06F 11/34 705/30 |
| 7,096,481 | B1 | | 8/2006 | Forecast et al. | |
| 7,383,229 | B2 | * | 6/2008 | Jacoby | H04N 7/173 18 348/E7.071 |
| 7,913,280 | B1 | * | 3/2011 | Roberts | H04N 21/4532 725/109 |
| 8,832,805 | B1 | * | 9/2014 | McGilliard | H04L 63/10 713/185 |
| 8,910,187 | B2 | * | 12/2014 | Liang | G06F 11/3476 709/224 |
| 8,914,496 | B1 | * | 12/2014 | Richardson | H06N 5/04 709/203 |
| 2007/0006275 | A1 | * | 1/2007 | Wright | A63F 13/10 725/133 |
| 2008/0052392 | A1 | * | 2/2008 | Webster | G06Q 30/02 709/224 |
| 2008/0196075 | A1 | * | 8/2008 | Candelore | H04N 5/44543 725/113 |
| 2009/0083781 | A1 | * | 3/2009 | Yang | G06F 17/30781 725/20 |
| 2009/0094113 | A1 | * | 4/2009 | Berry | G06F 17/30017 705/14.73 |
| 2009/0248855 | A1 | * | 10/2009 | Nastacio | G06F 17/30536 709/224 |
| 2011/0197213 | A1 | * | 8/2011 | Shim | H04N 60/33 725/9 |
| 2011/0307932 | A1 | * | 12/2011 | Fan | H04B 21/2547 725/110 |
| 2012/0110062 | A1 | * | 5/2012 | Savage | H04L 43/04 709/203 |
| 2012/0209949 | A1 | * | 8/2012 | Deliyannis | H04L 65/4084 709/217 |
| 2012/0303702 | A1 | * | 11/2012 | Richter | G06Q 50/01 709/204 |
| 2012/0330952 | A1 | * | 12/2012 | Kong | G06F 17/30864 707/737 |
| 2013/0198005 | A1 | * | 8/2013 | Xiong | G06Q 30/02 705/14.66 |
| 2013/0204825 | A1 | * | 8/2013 | Su | G06N 5/04 706/46 |
| 2013/0204997 | A1 | * | 8/2013 | Eggleston | H04L 41/5009 709/223 |
| 2014/0040786 | A1 | * | 2/2014 | Swanson | G06F 17/30899 715/760 |
| 2014/0130037 | A1 | * | 5/2014 | Shalom | G06F 8/61 717/176 |
| 2014/0130073 | A1 | * | 5/2014 | Yu | H04N 21/44222 725/14 |
| 2014/0258372 | A1 | * | 9/2014 | Lerman | H04L 67/42 709/203 |
| 2014/0282668 | A1 | * | 9/2014 | Gaya | H04N 21/44213 725/19 |
| 2015/0074522 | A1 | * | 3/2015 | Harned, III | G06F 17/214 715/269 |
| 2015/0088975 | A1 | * | 3/2015 | Wei | H04L 67/10 709/203 |

* cited by examiner

*Primary Examiner* — Anthony Mejia
(74) *Attorney, Agent, or Firm* — Foley & Lardner LLP; John D. Lanza (57) ABSTRACT

A processor-implemented method meters IP video streams. The processor implements a meter. The method includes detecting, by the processor, a video watch page; harvesting, by the processor, data from the video watch page; storing, by the processor, the harvested data as current page data; detecting, by the processor, a video play button operation indicating a video playing; and inferring, by the processor, the video playing correlates to a video referenced in the current page data.

19 Claims, 9 Drawing Sheets

METERING OF INTERNET PROTOCOL VIDEO STREAMS

BACKGROUND

Program providers supply content segments to viewers over various communications networks. Such content segments may include videos streamed, for example, over the Internet and received at a browser. Content segments also may include video advertisements that accompany, or in some way relate to the videos. Content segments also may be accessed using an application on a mobile device. Other content segments and other distribution methods are possible.

Program providers and advertisers may be interested in knowing what content segments are accessed or viewed. In the context of television viewing, a determination of viewing history is manageable. However, in the context of video content segments provided over the Internet, determining which video content segments are being viewed, or that have been viewed, and associated metrics data such as number of views, is becoming increasingly difficult to the point of being unmanageable because of the very large and ever-growing libraries of such video content segments available on the Web using devices such as smart televisions, games consoles and set top boxes. As these libraries increase in size, traditional counting solutions become intractable.

SUMMARY

A processor-implemented method meters IP video streams. The processor implements a meter. The method includes detecting, by the processor, a video watch page; harvesting, by the processor, data from the video watch page; storing, by the processor, the harvested data as current page data; detecting, by the processor, a video play button operation indicating a video playing; and inferring, by the processor, the video playing correlates to a video referenced in the current page data.

DESCRIPTION OF THE DRAWINGS

The detailed description refers to the following Figures in which like numerals refer to like items, and in which.

DETAILED DESCRIPTION

Program providers supply content segments to viewers over various communications networks. Content segments may include broadcast television programs. Content segments may include videos streamed, for example, over the Internet. Content segments also may include video advertisements that accompany, or in some way relate to the videos. Content segments may be accessed using an application on a mobile device. Other content segments and other distribution methods are possible.

Program providers and advertisers may be interested in knowing what content segments are accessed or viewed by which viewers. One way to determine this "viewing history" is by sampling a large population and making inferences about the viewing history based on the sample results. One way to sample a viewing population is through the use of individual panelists (viewers in the sample population) and metering devices that record and report on the individual panelists' viewing history. For example, an individual panelist (i.e., a viewer) may agree to installation of a meter at the panelist's residence. The meter records the individual panelist's television viewing and Internet activity, and reports the data to a remote server.

In the realm of broadcast television, one mechanism or process for determining the identity of a program displayed on a television is by recording audio samples emanating from the television, time-stamping the audio samples, providing the time-stamped audio samples to an reference site, and, at the reference site, creating audio fingerprints from the audio samples, and comparing the audio fingerprints to a reference library containing corresponding reference audio fingerprints. The audio samples may be collected using an audio meter built into the television, a STB, or another media device such as a tablet. The reference library may be created and essentially updated continuously by recording audio from every television program (or most such programs) on every channel, playing during a given time period such as, for example, a week. The reference audio fingerprints need not be retained for an extensive time because any measurement and comparison analysis between the sample fingerprints and the reference fingerprints may be performed in temporal proximity to the original broadcast of the program from which the reference and sample audio fingerprints are derived. Even when time-shifted television viewing is considered, the retention requirements of the reference audio samples may be short, on the order of a week.

While this audio comparison process may work effectively in the realm of broadcast television viewing, the process is now, or soon will be unmanageable when applied to consumption of video supplied over the Internet. That is, there is an ever-growing library of IP content (videos) available for consumption on the Web using a variety of media devices such as smart televisions, games consoles and STBs. As these libraries increase, the problem of tracking what videos are being watched gets harder and harder—traditional solutions such as audio-fingerprinting become intractable.

One potential solution to this problem is to determine, at a gateway device or router, other intermediary devices, and sniffer-based devices (i.e., metering devices installed on a receiving media device) the identity of videos being streamed from Internet Web sites for display on the media device. However, this approach also, generally, is not workable because videos typically are delivered as encrypted data packets, and so the intercepting router or other measurement device may not be able to accurately determine the video's identity.

To overcome the above-noted problems, and related problems, with determining viewing history of videos supplied over the Internet, disclosed herein are systems and methods that infer an identity of a displayed video based on information that may be harvested or scraped from a video watch page. In one aspect, a sniffer-based meter is operated to obtain these data from a video watch page.

More particularly, a sniffer-based meter may be used to determine what video (or other content for that matter) is being viewed in an internet protocol (IP) video stream. The meter takes advantage of the fact that, on the vast majority of streaming video Web sites, a viewer first navigates to a list of videos, selects a particular video, sees more details about the video (length, number of prior views, thumbnail) and then presses play. The herein disclosed sniffer based meter may be setup so that the sniffer determines that a viewer is visiting a streaming video (television) Web site (all Internet content passes through the sniffer), the sniffer may start looking at the content of the passing Web pages. The sniffer may detect when a video watch page (a page associated with a single video—in effect, the video's "home" page) passes. The passing of a video watch page may indicate that a viewer is about to play the video whose home page is the passing video watch page. When the sniffer detects a video watch page, the sniffer may "harvest" or "scrape" data such as video title information and other associated information from the Web pages passing though the sniffer. The sniffer then may store this harvested information in a "current page" buffer. When the sniffer detects a request for video content coming from the same media device (within some pre-determined time period), the sniffer may execute programming to infer that the requested video is related to the video from the harvested video watch page. Thus, rather than logging a random identification or locator (URL) for the video being displayed at the media device, the sniffer may log the video name, site and other metadata harvested from the video watch page. The sniffer then may report these data to a remote server or analytics service.

Figure 1:
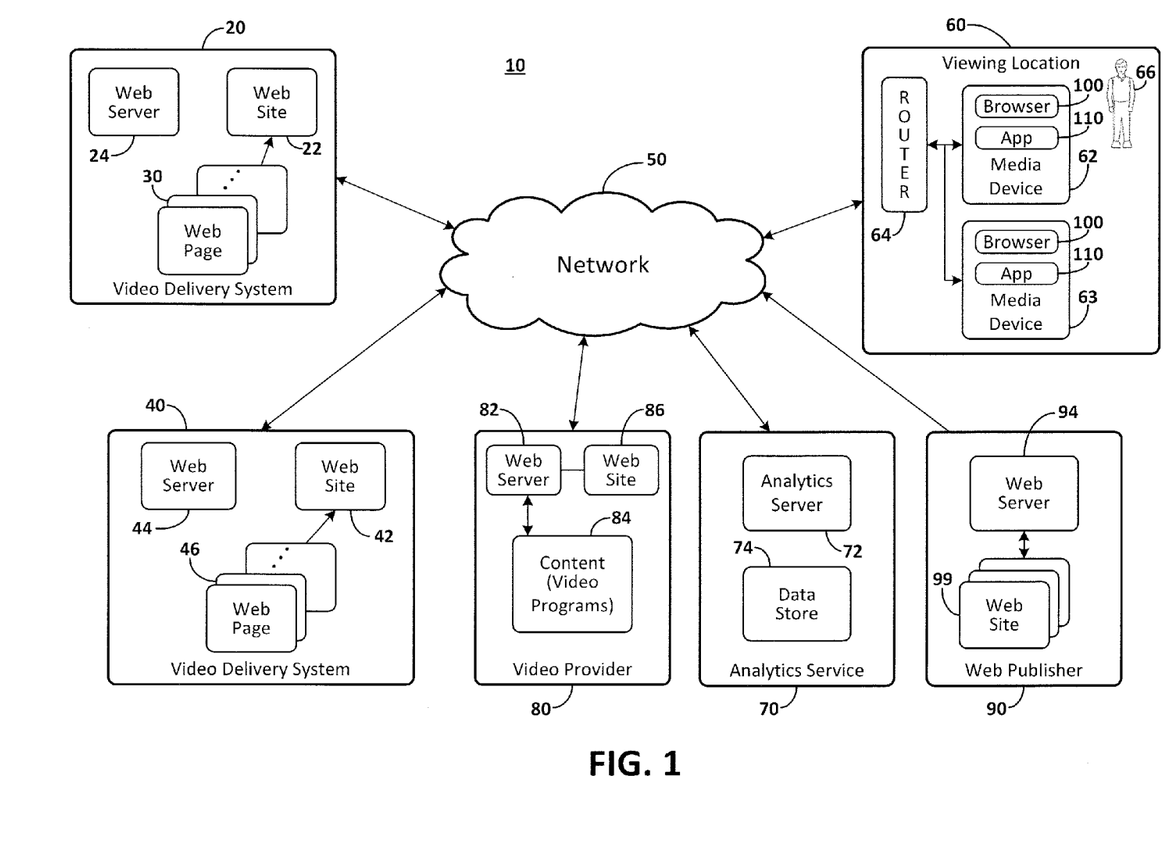
FIG. 1 illustrates an example environment in which metering of Internet protocol video streams is enabled.

FIG. 1 illustrates an example environment in which metering of Internet protocol (IP) video streams is enabled. In FIG. 1, environment 10 includes video delivery systems 20 and 40, viewing location 60, analytics service 70, video provider 80, and Web site publisher 90, all of which communicate over network 50. Although FIG. 1 shows these entities as separate and apart, at least some of the entities may be combined or related. For example, the video delivery system 20 and analytics service 70 may be part of a single entity. Other combinations of entities are possible.

The video delivery system 20 operates Web site 22. The Web site 22 is hosted on Web server 24. The Web site 22 includes Web pages 30. The Web site 22 may include Internet search features that allow Web site visitors 66 to search for videos and other content displayed by the Web server 24 on the Web pages 30. The Web pages 30 may display search results, namely content segments such as video programs, as well as video advertisements, static advertisements, and other information. Some advertisements may provide links to other Web pages where video advertisements and promoted video programs are displayed. The Web server 24 may provide links to enable navigation among the Web pages 30. The Web site 22 may display videos created/and or supplied by Web site visitor 66, video provider 80, and other entities.

The Web pages 30 may display search results in response to a search query submitted by Web site visitor 66. For example, a Web page 30 may display several videos that satisfy a search query. Each such video may be assigned a unique identification (ID).

The video delivery system 40 operates in a manner similar to that of the video delivery system 20. However, note that the systems 20 and 40 may not share video identification information. That is, each system may generate a unique ID for each video it provides, but the systems may make those IDs available only within their own systems.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1.

The viewing location 60 may be the residence of an individual, such as Web site visitor 66, who operates media devices 62 and 63 to access, through router 64, resources such as the Web sites 22. The viewing location 60 may be a mobile location that changes with time as, for example, when the Web site visitor 66 changes his location. The media devices 62 and 63 may be fixed or mobile. For example, media device 62 may be an Internet connected "smart" television (iTV); a "basic" or "smart" television connected to a set top box (STB) or other Internet-enabled device; a Blu-ray™ player; a game box; and a radio, for example. Media device 63 may be a tablet, a smartphone, a lap top computer, or a desk top computer, for example. The media devices 62 and 63 may include browsers, such as browser 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 110. The Web site visitor 66 may cause the media devices 62 or 63 to execute an application 110, such as a mobile banking application, to access online banking services. The application 110 may involve use of a browser or other means, including cellular means, to connect to the online banking services. Other applications may include game applications. The game applications may include provisions for serving video advertisements during the play of the game. Once connected to the Web site 22, the media devices 62 and 63 may allow viewing of content such as videos and static images generated by entities such as the video provider 80 and displayed on the Web pages 30 at the Web site 22.

The Web site visitor 66 may access the Web site publisher 90 to use a social networking Web site, a blog Web site, including a personal blog Web site and/or a commercial blog Web site, and other Web sites.

The analytics service 70 includes analytics server 72. The analytics service 70 may operate in conjunction with Web site operators to collect, analyze, and report information and data related to visits to Web sites and viewing of video advertisements by Web site visitors 66. The analytics service 70 may be part of the video delivery system 20, or the video delivery system 40, or may be a separate entity. The analytics service 70 collects, analyzes, stores (in data store 74), and reports on data and information related to visits to the Web site 22, operation of applications, and other reported activity.

In an embodiment, given the potentially large number of videos, search engines, and Web pages, the analytics service 70, and particularly the analytics server 72 and its associated data sore 74, may be replicated such that the analytics service 70 includes hundreds or thousands of such server-data store combinations in a distributed architecture that makes the analytics service 70 responsive to a very large number of video search requests per unit time.

The video provider 80 provides content, in the form of videos 84, which may be displayed on the Web pages 30 and viewed and/or heard by the Web site visitor 66 using the media devices 62 and 63. In an embodiment, the video provider operates, using Web server 82, video sharing Web site 86, and may embed the videos 84 on the Web site 86. However, the video provider may simply create and provide videos, such as polar bear videos, for display by other entities such as the video delivery system 20 or at a Web site operated by Web site publisher 90. The video provider 80 may be a company, a movie or television studio, or an individual.

The Web site publisher 90 operates Web sites 99 using Web server 94. The Web sites 99 may include those on which Web site visitors 66 may provide comments, upload videos, and upload images. The Web sites 99 may include social networking Web sites. The Web site publisher 90 may operate a Web hosting service, and the Web sites 99 may be personalized for and used by individuals, such as the Web site visitors 66.

Figure 2A:
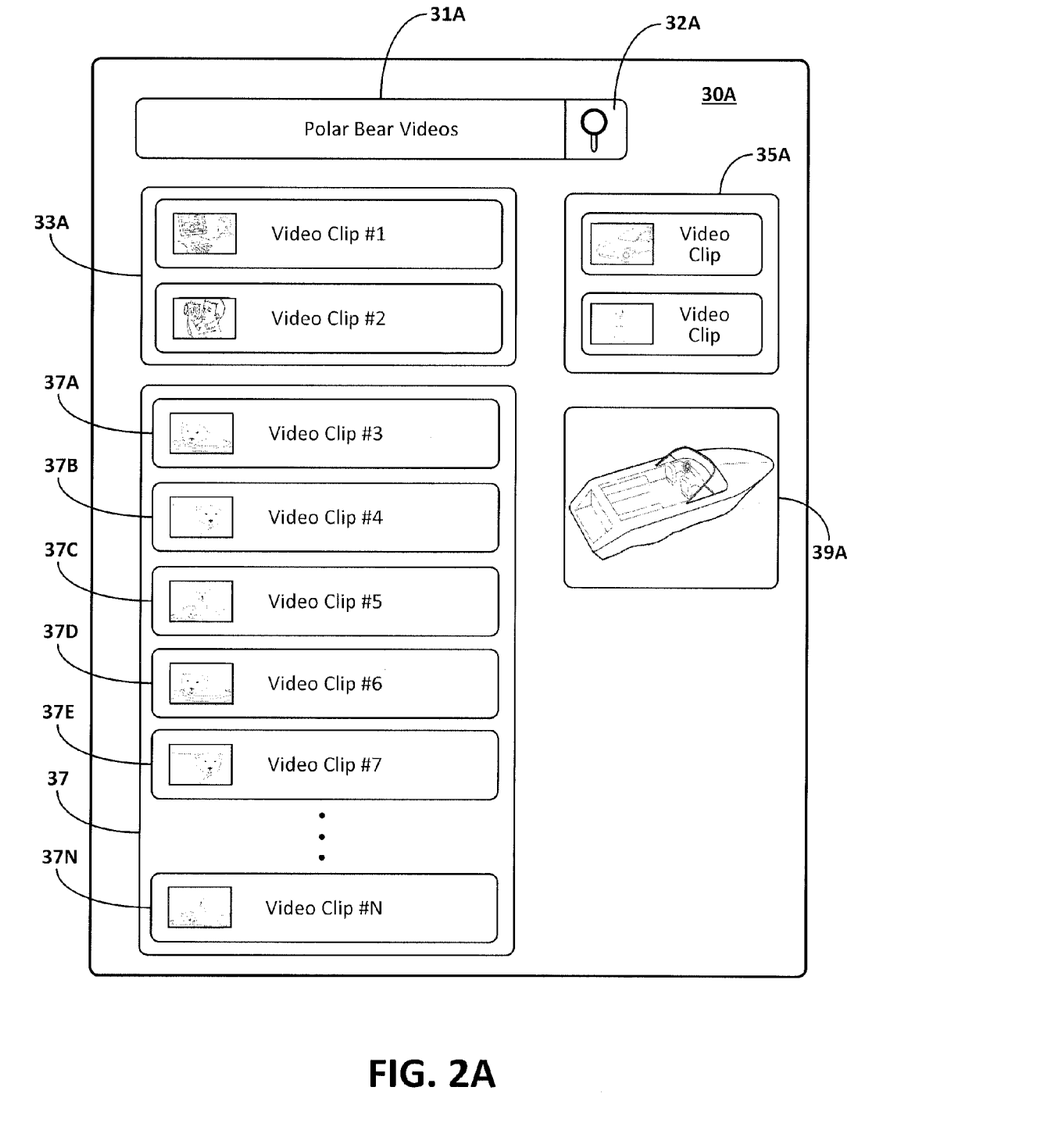
FIGS. 2A and 2B illustrate example Web pages associated with Internet protocol video streams.
Figure 2B:
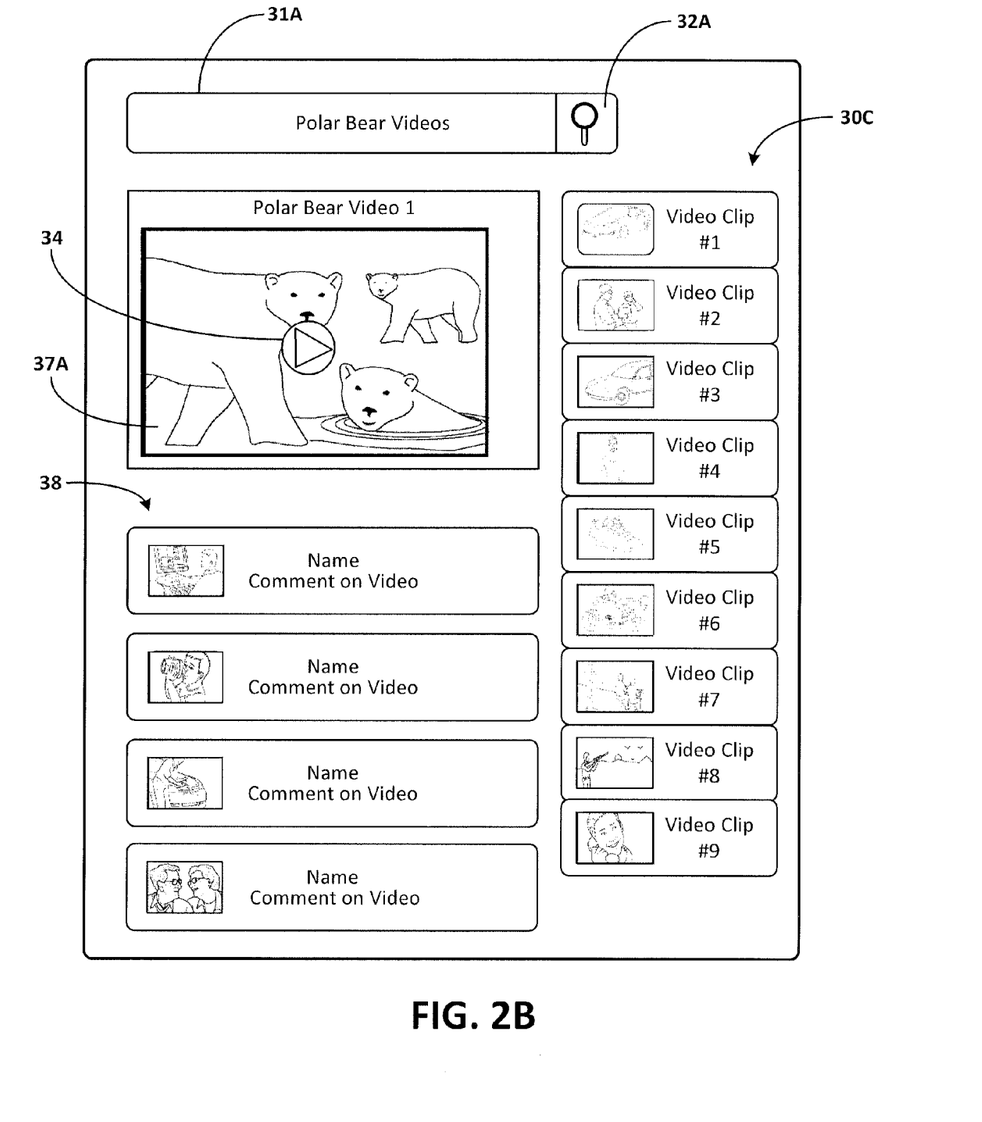

FIGS. 2A and 2B illustrate examples of Web pages on which videos programs may be referenced or displayed.

FIG. 2A illustrates an example Web page displaying results of a search query for polar bear videos. In FIG. 2A, search results Web page 30A includes search query window 31A in which Web site visitor 66 has entered a search query for polar bear videos. The Web site visitor 66 initiated the search by pressing search button 32A, which has a magnifying glass icon. A search engine returned polar bear videos 37A-N in video area 37. The Web site visitor 66 may select a video 37A to begin play by clicking on the video thumbnail. The video then will load from the video delivery system 20 and begin play. Alternately, the video delivery system 20 may supply a video watch page, and the selected video may begin play when the Web site visitor 66 presses a "soft" play button overlaying the selected video. The Web page 30A is shown to also include video advertisements 33A and 35A, and static advertisement 39A.

FIG. 2B illustrates example Web page 30C, which may be a video watch page, showing polar bear video 37A ready to begin play when "soft" play button 34 is operated. As can be seen, in addition to the polar bear video, Web page 30C also includes a comments section 38 in which Web site visitors 66 may comment on the video 37A, other videos, or other subjects.

Figure 3:
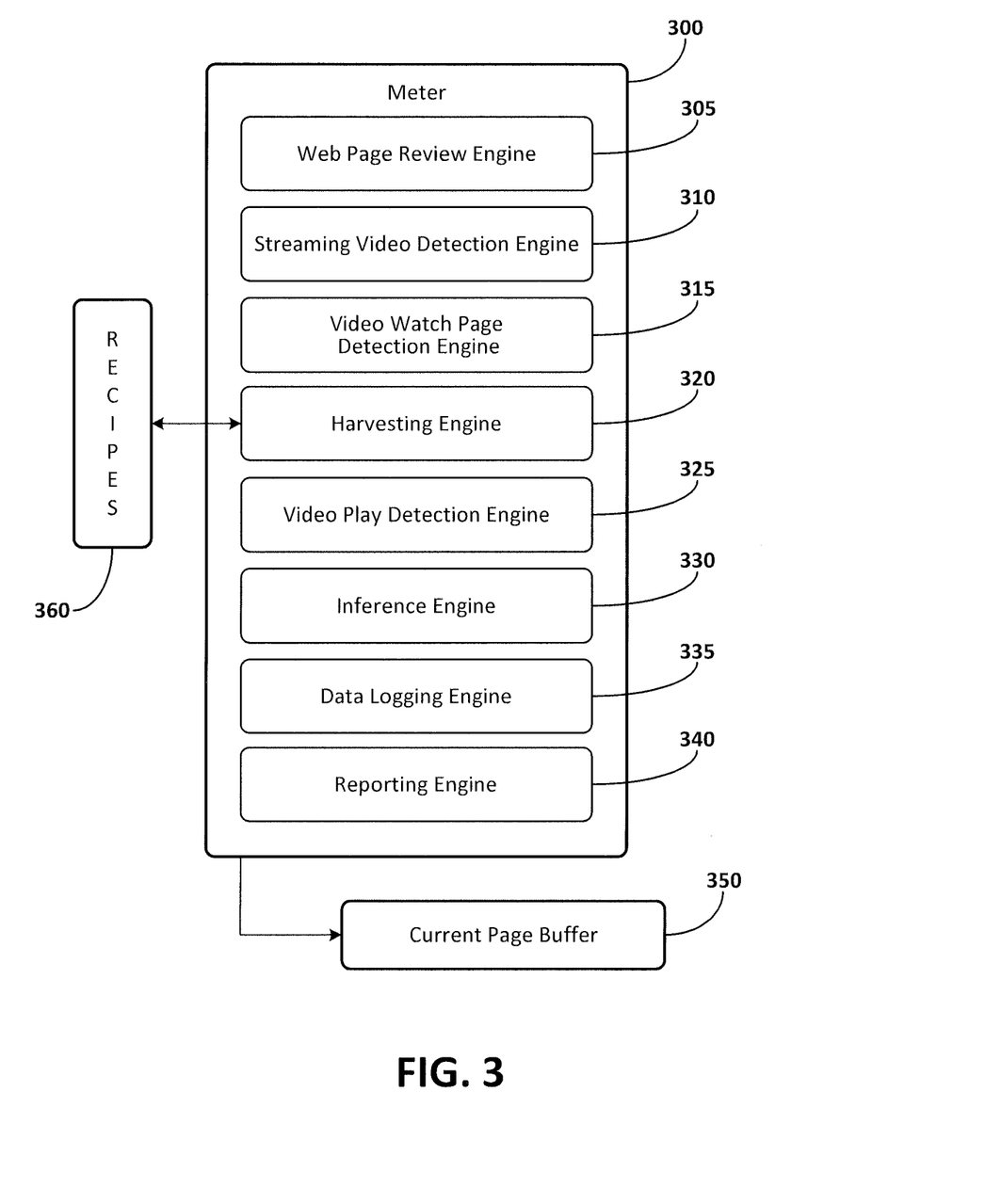
FIG. 3 illustrates an example meter that may harvest data related to videos in Internet protocol video streams.

FIG. 3 illustrate an example meter that may harvest data related to videos in IP video streams. The meter may be incorporated into the router 64 (se FIG. 1).

In FIG. 3, meter 300 includes Web page review engine 305, streaming video detection engine 310, video watch page detection engine 315, harvesting engine 320, video play detection engine 325, inference engine 330, data logging engine 335, and reporting engine 340. The meter 300 may store data harvested from video watch pages in current page buffer 350. The buffer 350 may be part of the meter 300 or may be external to the meter 300.

Web page review engine 305 reviews all Web pages passing through the router 64 to one of the media devices. Since the viewing location 60 shows two media devices 62 and 63, the meter 300 tracks which media device is displaying which Web page (e.g., in its browser).

Streaming video detection engine 310 determines when a passing Web page contains or is linked to a streaming video.

Video watch page detection engine 315 determines when a currently displayed Web page is a video watch page.

Harvesting engine 320 scrapes or harvests data from a currently viewed video watch page, buffers the data in buffer 350, and starts a timer (not shown) to count down a time until the buffer contents are dumped or the video reference in the video watch page begins playing. The time the data are retained in the buffer may be adjustable. Each time a new video watch page is displayed, the contents of the buffer 350 are cleared and replaced with data scraped from the now-current video watch page. In harvesting data from a video watch page, the engine 320 may consult a library 360 of recipes. The recipes may be generated at the analytics service 70 and pushed to the meter 300. The recipes contain instructions as to how video watch pages should be harvested. Different video watch pages may have different recipes.

Video play detection engine 325 detects operation of a video play button such as the button 34 of FIG. 2B. Detection of the button 34 may be by inference; that is, the video 37A begins play, and the engine 325 detects the play (streaming) of the video.

Inference engine 330 receives an indication of a video playing, consults the timer, and if time constrains are met, infers that the video playing correlates to the video reference in the buffer 350.

Data logging engine 335 logs the harvested data in a separate buffer (not shown).

Reporting engine 340 periodically reports the logged data to the analytics service 70.

Figure 4A:
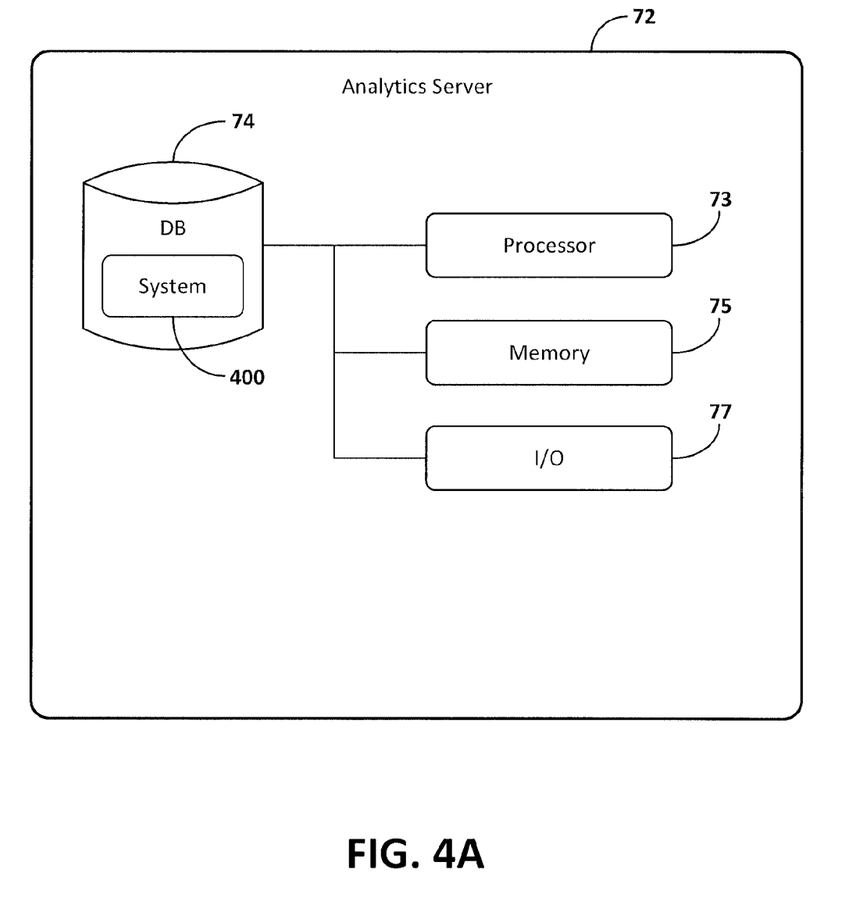
FIGS. 4A and 4B illustrate an example analytics system that receives data from the meter of FIG. 3.

FIG. 4A illustrates example analytics system 400 that receives data from the meter 300 of FIG. 3. FIG. 4A also illustrates select components of the analytics service 70 as implemented on server 72.

FIG. 4A shows the system 400 stored in non-transitory computer-readable storage medium 74, processor 73, memory 75, and input/output (I/O) 77. The processor 73 loads the system into memory 75 and executes the instructions contained in the system 400. The I/O 77 allows other machines and systems to communicate with the processor 73.

Figure 4B:
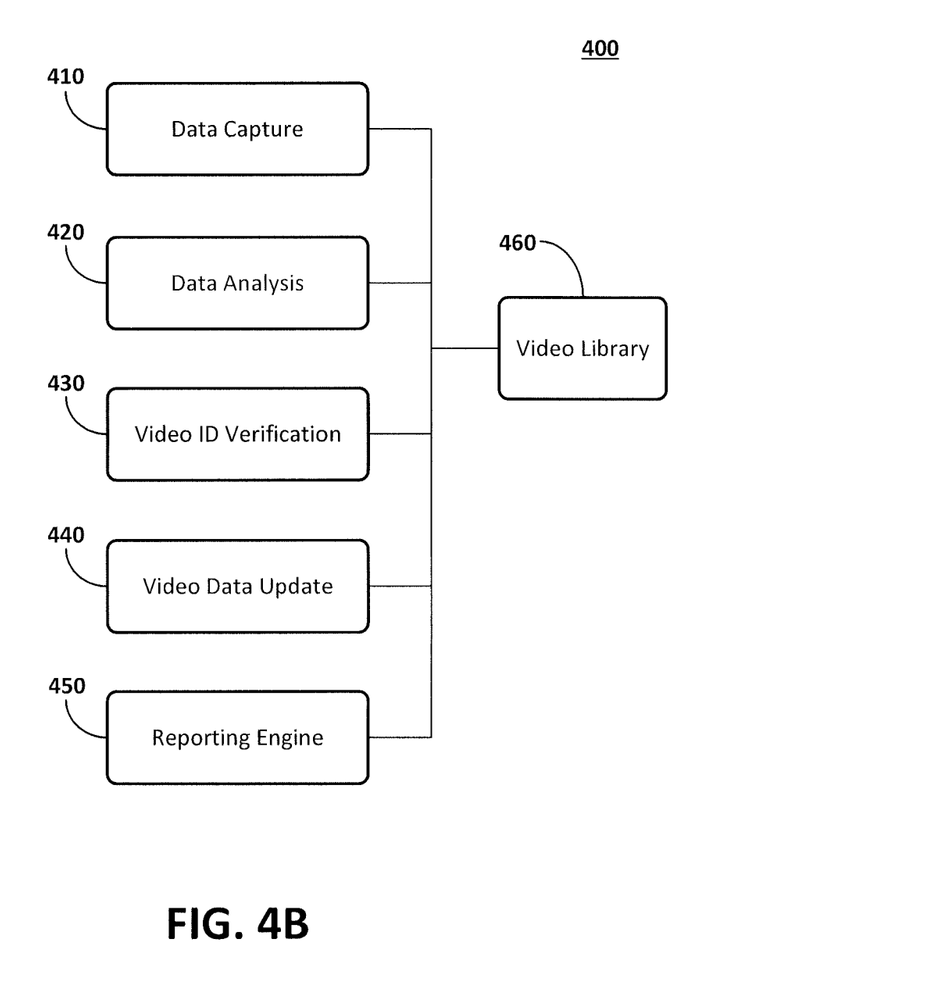

FIG. 4B illustrates components of the analytics system 400. In FIG. 4B, system 400 includes data capture engine 410, data analysis engine 420, video identification verification engine 430, video data update engine 440, and reporting engine 450. Processor-implemented components of the system 400 may store data in, and reference data in video library 460, which in turn may reside in data store 74.

Data capture engine 410 receives video-related data from meter 300. The engine 310 also may receive data from other sources. For example, the engine may receive video-related data from a producer of a video. Such data may include video length, title, ID, and other data.

Data analysis engine 420 reviews data received from meter 300 to determine if the received data should be processed and stored.

Video identification verification engine 430 compares the video data received from the meter 300 to reference video data in library 460 to determine if a match exists (within a stated confidence level).

Video data update engine 440 updates existing entries in video library if a match exists and if such updates are appropriate. If a match does not exist, the engine 440 may create a new entry in the library 460. The engine 440 also may create and/or update data collection recipes for associated video display pages, and may store the recipes in the library 460. The engine 440 may include a link from recipe to associated video(s). That is, a recipe may apply to more than one video, and more than one video watch page.

Reporting engine 450 may push recipes to meter 300 and may report the results of video watching to an external entity, such as the video program provider 20.

Figure 5A:
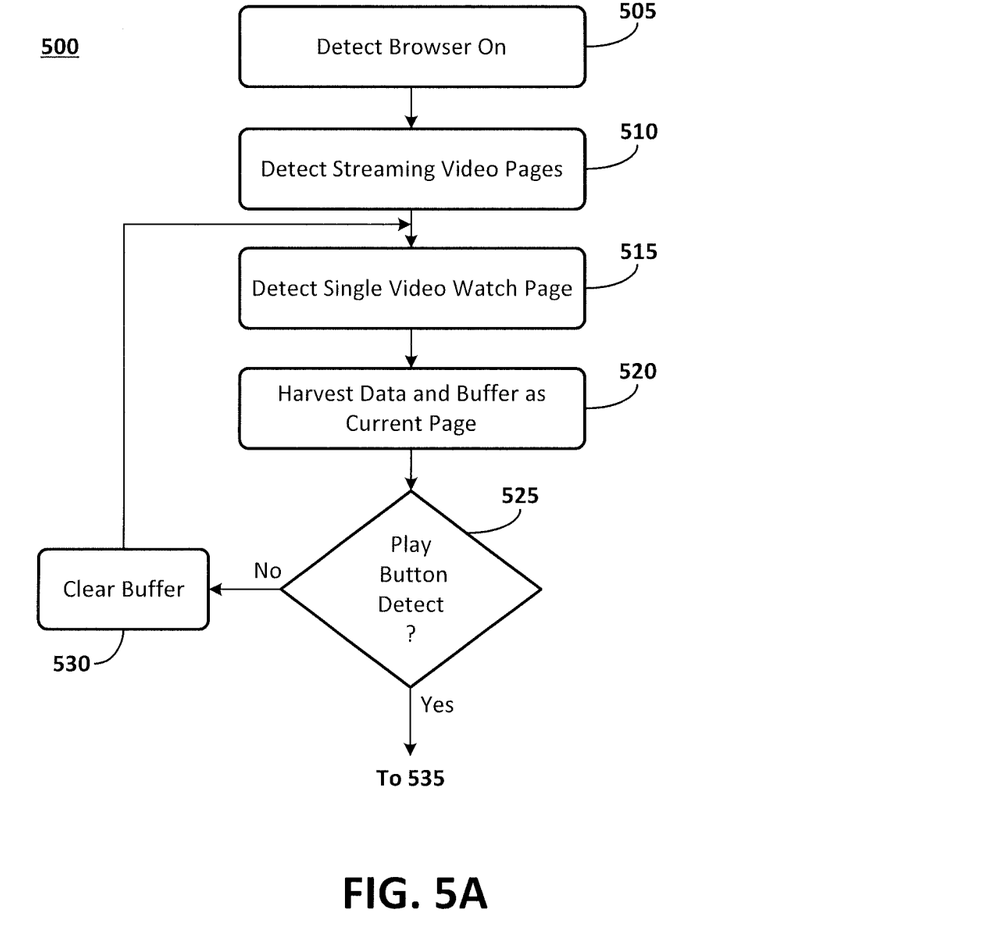
FIGS. 5A-5C are flowcharts illustrating example methods executed by the devices and systems of FIGS. 3-4B.
Figure 5B:
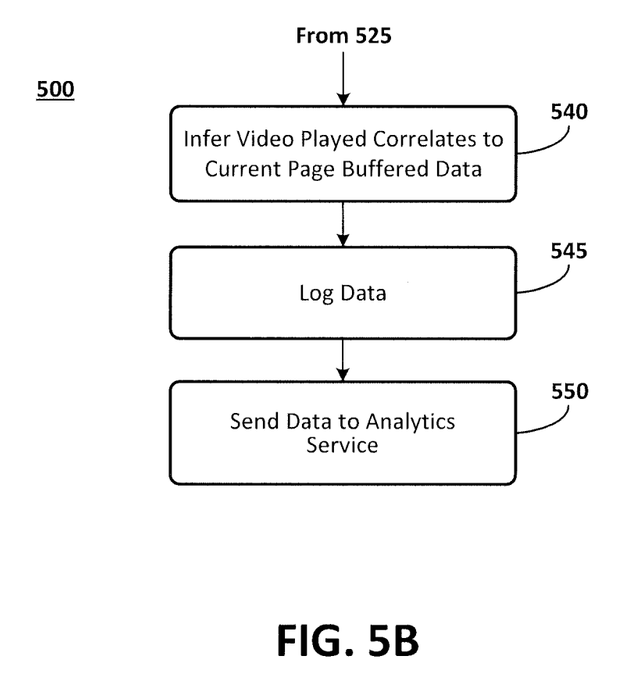
Figure 5C:
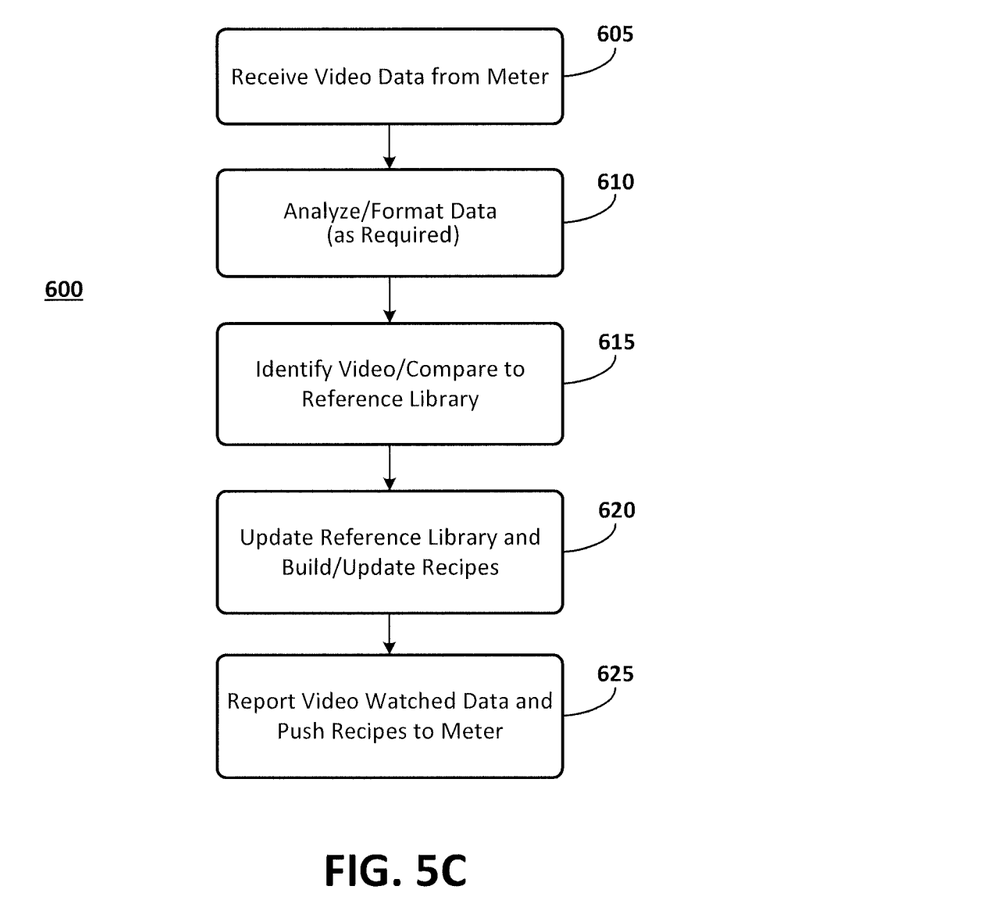

FIGS. 5A-5C are flowcharts illustrating sample methods executed by the components and systems of FIGS. 3 and 4.

FIGS. 5A and 5B illustrate method 500 executed by processing components on router 64 and/or meter 300. Method 500 begins in block 505 when the meter 300 detects a browser activation of a connected media device. In block 510, meter 300 detects streaming video Web pages. In block 515, meter 300 detects a video watch page. In block 520, meter 300 harvests data from the video watch page. In harvesting data, the meter 300 may follow a recipe specific to the video watch page, generic for similar video watch pages, a default recipe, or no recipe. The recipes may be pushed to the meter 300 by analytics service 70. Once the data are harvested, the meter 300 stores the data as current page data in buffer 350 after first clearing buffer 350, if required. The meter 300 also starts a time after loading buffer 350.

In block 525, the meter 300 determines if a video play button operation has been detected within a time threshold measured by the timer. If no detection of a video play has been detected, and the time threshold, as indicated by the timer, has been reached, the method moves to block 530. If operation of the video play button has been detected within the time threshold, the method moves to block 535.

In block 530, the meter 300 clears the buffer 350 and the method 500 returns to block 515.

In block 535, the meter 300 infers the video playing correlates to the video referenced in the buffered video watch page. The method 500 then moves to block 545, and the meter 300 logs the data of the current watch page. In block 550, the meter 300 reports the logged data to the analytics service 70. The method 500 then ends.

FIG. 5C is a flowchart illustrating example method 600, which is executed on server 72. Method 600 begins in block 605 when the server 72 receives logged data from the meter 300. In block 610, server 72 analyzes and formats the data (as required) to prepare the data for analysis and subsequent storage and reporting. In block 615, the server 72 identifies the video referenced in the logged data from meter 300 by comparison to entries in reference library 460. In block 620, server 72 updates references in video library 460 or creates a new entry. The server 72 also may update or create a recipe related to the associated video watch page. In block 625, the server 72 reports data to an external, third party, and pushes updated recipes to the meter 300. The method 600 then ends.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 5A-5C. The disclosed devices, components, and systems contemplate using or implementing any suitable technique for performing the steps illustrated. Thus, FIGS. 5A-5C are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

I claim:

1. A method for metering IP video streams, comprising:
   receiving, by a processor of a gateway device coupling a connected media device to an IP video delivery system, a request for a video watch page from the connected media device;

transmitting, by the processor, the request to the IP video delivery system;

receiving, by the processor, the video watch page from the IP video delivery system;

extracting, by the processor, data from the video watch page;

storing, by the processor, the extracted data as current page data;

transmitting, by the processor, the video watch page to the connected media device;

receiving, by the processor, a request for video content from the connected media device;

transmitting, by the processor, the request for video content to the IP video delivery system;

receiving, by the processor, the video content from the IP video delivery system in response to the request for video content, the video content encrypted by the IP video delivery system;

transmitting, by the processor, the video content to the connected media device; and identifying, by the processor, that the video content correlates to a video referenced in the current page data.

2. The method of claim 1, further comprising:

detecting, by the processor, activation of a browser on the connected media device; and detecting, by the processor, a streaming video Web page rendered on the browser.

3. The method of claim 1, wherein extracting data comprises following a data harvesting recipe, the data harvesting recipe pushed to the processor from an external analytics service.

4. The method of claim 3, wherein the data harvesting recipe comprises one of a recipe specific to the video watch page, a generic recipe for similar video watch pages, and a default recipe.

5. The method of claim 1, further comprising determining, by the processor, when operation of a video play button has been detected within a time threshold of storing the current page data.

6. The method of claim 1, further comprising: discarding the current page data when a video play button operation is not detected within a time threshold.

7. The method of claim 1, wherein the processor is implemented in a gateway device coupling multiple connected media devices to an IP video delivery system, wherein the method further comprises detecting, by the processor, a media device requesting streaming IP video.

8. A system for metering IP video streams, comprising:

a gateway device coupling a connected media device to an IP video delivery system, the gateway device comprising a computer readable storage medium and a processor configured to:

receive a request for a video watch page from the connected video device;

transmit the request to the IP video delivery system;

receive the video watch page from the IP video delivery system;

extract data from the video watch page;

store the extracted data as current page data;

transmit the video watch page to the connected media device;

receive a request for video content from the connected media device;

transmit the request for video content to the IP video delivery system;

receive the video content from the IP video delivery system in response to the request for video content, the video content encrypted by the IP video delivery system;

transmit the video content to the connected media device; and infer that the video content correlates to a video referenced in the current page data.

9. The system of claim 8, the processor further configured to:

detect activation of a browser on the connected media device; and detect a streaming video Web page rendered on the browser.

10. The system of claim 8, wherein the processor extracts data from the video watch page by following a data harvesting recipe, the data harvesting recipe pushed to the processor from an external analytics service.

11. The system of claim 10, wherein the data harvesting recipe comprises one of a recipe specific to the video watch page, a generic recipe for similar video watch pages, and a default recipe.

12. The system of claim 8, wherein when the processor determines operation of a video play button has been detected within a time threshold of storing the current page data.

13. The system of claim 8, wherein the current page data is discarded when a video play button operation is not detected within a time threshold.

14. The method of claim 1, further comprising: determining, by the processor, when operation of a video play button has been detected by the gateway device within a time threshold of storing the current page data.

15. The method of claim 1, further comprising: discarding the current page data when a video play button operation is not detected by the gateway device within a time threshold.

16. The method of claim 1, wherein extracting data comprises following a data harvesting recipe, the data harvesting recipe pushed to the processor from an external analytics service.

17. The method of claim 16, wherein extracting data comprises identifying data to extract without a data harvesting recipe.

18. The method of claim 1, further comprising determining, using the processor, that the request for video content has been detected within a pre-determined time period of storing the current page data.

19. The method of claim 1, further comprising:

receiving, from the gateway device, second data extracted from detection of a second video watch page rendered on the connected media device;

clearing, from the computer readable medium, the current page data;

storing, in the computer readable medium, the second extracted data as the current page data;

receiving, from the gateway device, detection of a second request for video content from the connected media device; and identifying, using a processor, that the second request for video content correlates to a second video referenced in the current page data.

* * * * *